United States Patent Office 3,190,848
Patented June 22, 1965

3,190,848
CURING OF PLASTICIZED OLEFIN-TYPE POLYMERS CONTAINING TERMINAL EPOXY AND HYDROXY GROUPS
Henry L. Hsieh and Robert C. Wheat, both of Bartlesville, Okla., assignors to Phillips Petroleum Company, a corporation of Delaware
No Drawing. Filed May 22, 1961, Ser. No. 111,492
9 Claims. (Cl. 260—30.4)

This invention relates to a method of plasticizing polymers having terminal hydroxy and epoxy groups to produce an improved cured polymeric composition. In another aspect it relates to the product thus produced.

It has been disclosed in copending application Serial No. 772,167, of Uraneck, Short, Hsieh, and Zelinski, filed November 6, 1958, now U.S. Patent 3,135,716, that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal substituents on the polymer molecule enables substantially more effective cures since all of the molecule can be tied into the cross linked structure. Also, by simple coupling arrangements, alone or with auxiliary curing, liquid polymers can be readily converted into solids and soft tacky rubber can be made quite rigid. The term "telechelic" has been coined to define these terminally reactive polymers. As used in this specification, telechelic polymers mean polymers of vinylidene-containing monomers which contain a reactive group on each end of the polymer molecule. By employing a suitable initiator polymers can be prepared which contain reactive groups on only one end of the polymer molecule in which case the term "semi-telechelic" is used to denote these polymers.

Plasticizers or softeners are frequently used to improve the processing characteristics of elastomers, particularly when the polymers which are being compounded have high molecular weights and are tough and difficult to mill or extrude. Although various plasticizers and extender oils can be used, this frequently results in the sacrifice of physical properties of the vulcanizates. Also since most plasticizers of this nature are merely blended into the composition, they are not a part of the polymer network and are, therefore, readily extractable or tend to bleed from the finished product.

We have found that plasticizers which contain at least 1 and preferably 2 or more epoxy and/or hydroxy groups can be used with improved results for plasticizing polymers of substantially higher molecular weight when the polymer contains a hydroxy and an epoxy group at each end of the polymer molecule and the resulting polymer is cured with a polyfunctional organic compound which is reactive with the epoxy or hydroxy groups which are present in the plasticizing compound. In this manner high Mooney rubber can be processed conveniently without sacrificing physical properties which frequently accompanies the use of plasticizer oils to improve processability. Although the invention is especially important in improving the processability of high Mooney rubbers it can also be employed to improve the fabrication characteristics of low Mooney polymers, or semi-solid and liquid polymers containing epoxy and hydroxy terminal groups. Addition of such a plasticizer improves the castability of liquid polymers with no significant sacrifice of physical properties of the cured composition.

It is an object of our invention to provide a method of preparing an improved cured polymeric stock from polymers containing terminal hydroxy and epoxy groups. Another object is to provide a method of plasticizing polymers containing terminal epoxy and hydroxy groups in such a manner that the processability of the polymer is improved without sacrificing physical properties of the cured product. Another object is to provide a cured plasticized polymeric composition in which the plasticizer is tied into the cured polymer network and therefore has substantially no tendency to bleed or be extracted from the polymer. Other objects, advantages, and features of our invention will be apparent to those skilled in the art from the following discussion.

The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of my invention and preferred monomers are butadiene, isoprene and piperylene.

In addition to the conjugated dienes I can practice my invention with other monomers containing a $CH_2=C<$ group such as the vinyl-substituted aromatic compounds. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include: 3-methylstyrene(3-vinyltoluene), 4-n-propylstyrene, 4-dodecylstyrene, 4-cyclohexylstyrene, 2-ethyl-4-benzylstyrene, 4-p-tolylstyrene, 4-(4-phenyl-n-butyl)styrene, 4-methoxystyrene, 3,5-diphenoxystyrene, 4-dimethylaminostyrene, 4-methoxy-6-di-n-propylaminostyrene, 4,5-dimethyl - 1 - vinylnaphthalene, 8-phenyl-1-vinylnaphthalene, 4 - methoxy - 1 - vinylnaphthalene, 3,6-dimethylamino-1-vinylnaphthalene, and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers or copolymers with each other. These polar monomers can be employed to form block copolymers with conjugated dienes and/or vinyl-substituted aromatic compounds. When preparing these block copolymers the polar monomer is introduced after the non-polar monomers have polymerized. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include: 2-vinylpyridine, 3,5-diethyl-4-vinylpyridine, 3-n-dodecyl-2-vinylpyridine, 5-cyclohexyl-2-vinylpyridine, 4-phenyl-2-vinylpyridine, 3-benzyl-4-vinylpyridine, 6-methoxy-2-vinylpyridine, 4-phenoxy-2-vinylpyridine, 4-dimethylamino-2-vinylpyridine, 2-vinylquinoline, 3-methyl-4-ethoxy-2-vinylquinoline, 3-vinylisoquinoline, 4-phenyl-1-vinylisoquinoline and the like.

Other polar monomers includes acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N - dimethylacrylamide, N,N - diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound. Ordinarily the initiator is prepared in a polar solvent such as an ether, for example, diethyl ether.

The organo alkali metal compound initiates the polymerization reaction, the organo radical ordinarily being incorporated in the polymer chain and the alkali metal being attached terminally at at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 1 to 4.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 1 to 4. The R in the formula generally contains from 1 to 20 carbon atoms although it is within the scope of the invention to use higher molecular weight compounds. By far the best results are obtained with organolithium compounds which give very high conversions to the terminally reactive polymer. Lithium is, therefore, the preferred alkali metal for the polymerization initiator. Examples of mono- and poly-alkali metal substituted hydrocarbons which can be employed for the polymerization initiator include methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,10-dilithiodecane, 1,-20-dilithioeicosane, 1,4-dilithio-2-methyl-2-butene, 1,4-dipotassio-2-butene, dilithionaphthalene, 4,4'-dilithiobiphenyl, dilithioanthracene, 1,2-dilithio-1,1-diphenylethane, 1,2-dilithio-1,2-diphenylethane, 1,4-dilithiocyclohexane, 1,3,5-trilithiocyclohexane, 1,4-dirubidiobutane, 1,8-dicesiooctane, 1,5-dilithio-3-pentyne, dilithiophenanthrene, 1,2-dilithiotriphenylethane, dilithiomethane, and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithium-stilbene adduct). An initiator which is preferred for the formation of semitelechelic polymers is n-butyllithium. Other preferred initiators for the formation of telechelic polymers are the dilithium adducts of 2,3-dialkyl-1,3-butadienes, 2,3 - dimethyl - 1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 40 millimoles per 100 grams of monomers. It is preferred that the polymerization be carried out in the presence of a suitable diluent which is predominantly hydrocarbon, such as benzene, toluene, cyclohexane, methylcyclohexane, xylene, n-butane, n-hexane, n-heptane, isooctane, and the like. Generally the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization. As stated previously, the organolithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

Polymer chains resulting from the above described process are terminated with 1 or more alkali metal atoms, preferably lithium atoms, depending upon the initiator employed. Without terminating the polymerization mixture or previously treating it in any way to remove the alkali metal atoms from the polymer, the polymer is then treated with a compound selected from the group consisting of polyepoxides, epoxy aldehydes, epoxy ketones and epoxy esters. These terminating agents are reacted with the alkali metal-containing polymer, in solution, preferably in the polymerization solution, which is generally hydrocarbon. The terminating agents contain at least 2 functional groups, one of which is epoxy and the other is either epoxy or a carbonyl, as is present in an aldehyde or ketone, or a carbonyl as is present in an ester linkage. Any organic compound of this type can be used providing it is soluble in the polymer solution. Examples of suitable terminating agents include butadiene dioxide (1,2,3,4 - diepoxybutane), 1,2,5,6 - diepoxy hexane, glycidaldehyde (2,3-epoxypropionaldehyde), 3,4-epoxybutyraldehyde, 3,4-epoxyvaleraldehyde, 1,2,4,5-diepoxy-3-pentanone, 1,2,4,5 - diepoxy-3-hexanone, limonene dioxide, diepoxyethers of ethylene glycol such as bis-epoxydicyclopentyl ether of ethylene glycol and the corresponding thioethers, dicyclo diepoxy carboxylates such as (2-methyl-4,5-epoxycyclohexyl)methyl 2 - methyl-4,5-epoxycyclohexyl carboxylate, 1,2,5,6,9,10-triepoxydecane, 1,2,11,12 - diepoxy - 5,8 - dioxadodecane, 1,2,9,10 - diepoxy - 4,7 - dithiadecane, 1,2,16,17 - diepoxy-6,9,12-trithiaheptadence, 1,2,12,13 - diepoxy-4,7,10-trioxahexadecane, 4,5,9,10 - diepoxydecanal, 4,5,9,10,13,14 - triepoxytetradecanal, 1,2,11,12-diepoxy-8-pentadecanone, 2, 3,18,19 - diepoxy-7,14-eicosanedione, 3,4-epoxybutyl 5,6-epoxyhexanoate, 5,6-epoxydecyl, 5,6-epoxydecanoate, and the like. Other types of functional groups can be present in these compounds provided they are less reative than the epoxy or carbonyl groups present. Generally the compounds are hydrocarbons, ethers, thioethers, or esters containing the epoxy or epoxy and carbonyl groups.

The most convenient method of operation is to add the functional terminating agent to the unquenched polymer solution which is formed in the polymerization process. The temperature of treatment can vary from about —50° to 100° C., preferably from about 0 to 75° C. The reaction time is governed largely by the temperature, higher temperatures requiring shorter reaction periods, and can vary from 1 minute to as high as 80 hours or more, although there is seldom need to extend the reaction period beyond 20 or 25 hours.

The amount of bifunctional terminating agent can vary from 1 to 40 gram moles of epoxy or carbonyl group per gram atom of alkali metal present in the polymer. Smaller amounts of terminating agent promote coupling reactions whereas with larger amounts less coupling occurs. Coupling reactions result not only in polymer chains containing epoxy-hydroxy terminal groups but in hydroxy groups spaced at intervals along the polymer chain, i.e., at points where coupling has occurred.

When the terminating reagent is an epoxy aldehyde, ketone, ester or polyester, the alkali metal terminated polymer reacts with the carbonyl group and when coupling occurs the epoxy group undergoes reaction with more of the alkali metal terminated polymer. Whether or not coupling occurs, replacement of the alkali metal with hydrogen gives a hydroxy group. Similarly reaction of the alkali metal terminated polymers with polyepoxides can yield polymers with hydroxy groups along the polymer chain where coupling occurs as well as epoxyhydroxy terminal groups. The alkali metal atoms can be replaced with hydrogen atoms by hydrolysis or reaction with a suitable reagent such as dilute mineral acids, glacial acetic acid, or other organic acids, alcohols or alcohol-water mixtures, such as, methyl alcohol, ethyl alcohol solution, mixtures of alcohols and acids and the like.

The products thus produced can be coupled and/or cured with various types of polyfunctional curatives which will react with the hydroxy and/or epoxy groups. The term "polyfunctional curatives" is intended to include compounds containing 2 or more functional groups. In general these polyfunctional coupling agents include poly-isocyanates, polybasic acids, acid anhydrides, polyamines, polybasic acid chlorides, and such compounds as chloromethylphosphonic dichloride. Polyisocyanates, which contain 2 or more NCO groups can be used to react with either the hydroxy or epoxy terminal groups of the molecule. Where the polymer is prepared with a monoalkali metal initiator and contains reactive groups on only 1 end of the molecule, the polyisocyanate produces coupling. Otherwise coupling and/or crosslinking can be effected by controlling the amount of polyisocyanate employed. Examples of suitable compounds of this type include benzenes 1,3-diisocyanate, hexane 1,6-diisocyanate, tolylene 2,4-diisocyanate, tolylene 2,3-diisocyanate, diphenylmethane 4,4′-diisocyanate, naphthalene 1,5-diisocyanate, diphenyl 3,3′-dimethyl 4,4′-diisocyanate, diphenyl 3,3′-dimethoxy 4,4′-diisocyanate, 2,2′-diisocyanate diethyl ether, 3(diethylamino)pentane 1,5-diisocyanate, butane 1,4-diisocyanate, cyclohex-4-ene 1,2-diisocyanate, benzene 1,2,4-triisocyanate, naphthalene 1,3,5,7-tetraisocyanate, naphthalene 1,3,7-triisocyanate, and the like.

A suitable commercially available polyaryl polyisocyanate, is PAPI 1, a product of Carwin Chemical Company. This material has an average of 3 isocyanate groups per molecule and an average molecular weight of about 380. Its general formula is:

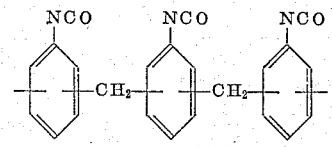

The polyisocyanates can be aliphatic, cycloaliphatic or aromatic compounds. Preferably the polyisocyanates are represented by the general formula $R(NCO)_m$ wherein R is a polyvalent organic radical containing from 2 to 30 carbon atoms and $m$ is 2,3, or 4. R can be aliphatic, cycloaliphatic or aromatic. Also we prefer that the organic radical be essentially hydrocarbon in character although the presence of unreactive groups containing elements other than carbon and hydrogen is permissible.

Polybasic acids can be reacted with either the hydroxy or epoxy group of the polymer. Examples of such acids include, maleic acid, pyromellitic acid, succinic acid, phthalic acid, terephthalic acid, trimellitic acid, and the like. The acids thus illustrated contain from 4 to 10 carbon atoms an from 2 to 4 carboxy groups. Acid anhydrides can also be reacted with either the hydroxy or epoxy groups, and examples of suitable anhydrides include maleic anhydride, pyromellitic dianhydride, and the like. Acid chlorides, such as phthaloyl chloride, terephthalyl chloride and fumaryl chloride can be reacted with the hydroxy groups of the polymer as can such compounds as dichloromethylphosphonic dichloride, and the like. Polyamines can be used to react with the terminal epoxy groups. Examples of such polyamines include tetraethylenepentamine, ethylenediamine, diethylenetriamine, triethylenetetramine, o-phenylenediamine, 1,2-propanediamine, 1,2-butadiamine, 1,2,3-benzenetriamine, 3,3′-biphenyldiamine, and the like. The polyamines thus illustrated contain from 2 to 12 carbon atoms and from 2 to 5 amine groups. Amine terminated polyamides such as can be produced by condensation of polyamines with polybasic acids can also be used. These polyfunctional organic coupling agents are preferably used in about stoichiometric amounts although slightly less than stoichiometric to amounts in substantial excess can be employed. Generally the amount of curative is in the range of about 80 percent to 150 percent stoichiometric, based upon either the hydroxy or epoxy content of the polymer. Temperatures anywhere within the range of —100 to 500° F. will produce curing reactions although preferred temperatures are in the range of 50 to 350° F. The time for curing can range anywhere from about 5 minutes to 100 hours or longer, depending upon the material being reacted and the temperature of the reaction. Ordinarily the curing is carried out after the polymer has been compounded with the coupling agent, reinforcing materials such as carbon black or mineral fillers, and an auxiliary curative such as an organic peroxide. Mineral fillers used are those normally employed in compounding rubbery stocks such as silica, titanium dioxide, zinc oxide, calcium carbonate, zinc sulfide, calcium silicate, hydrated alumina, calcined magnesia and various types of clays. Filler loadings can vary over a wide range, for example, between about 20 to 500 parts or higher of filler per 100 parts of polymer. If an auxiliary conventional curative is employed such as a sulfur compound or organic peroxide, the amount of such curative will ordinarily be in the range of about 0.05 to 5 parts by weight per 100 parts of polymer, preferably about 0.1 to 3 parts of curative per 100 parts of polymer.

The plasticizers which are used in this invention contain at least 1 hydroxy and/or epoxy group and preferably contain 2 or more such functional groups. Hydrocarbons, ethers, thioethers, or esters containing epoxy or hydroxy groups are suitable. Examples of these materials include epoxidized liquid polymers such as epoxidized liquid polybutadiene, polyepoxy ethers such as bis-epoxydicyclopentyl ether of ethylene glycol and homologues thereof and corresponding thioethers, polyepoxy esters such as (2-methyl-4,5-epoxycyclohexyl)methyl 2-methyl-4,5-epoxycyclohexyl carboxylate, hydroxylated conjugated diene polymers such as hydroxylated liquid polybutadiene, polyvinyl alcohol, and liquid polymers of the same type as those being plasticized only of much lower molecular weight. Examples of other suitable compounds which are typical are 1,2,14,15-diepoxy-5,8,11-trioxapentadecane, 1,9,16 - trihydroxy-4,5,13,14-diepoxy hexadecane, 1,12 - bis(3,4-epoxycyclohexyl)-5,8-oxadodecane, 1,12-bis(3-hydroxycyclopentyl)-5,8-oxadodecane, 6-hydroxyhexyl 4,5-epoxyoctanoate, di(3,4-epoxybutyl) and ester of hexanedioic acid, di(3-hydroxypropyl) ester of dodecanedioic acid, di(3,6-dihydroxyhexyl) ester of dodecanedioic acid. Generally the molecular weight of the plasticizer is not greater than 10 percent of the molecular weight of the polymer being plasticized. The plasticizer should not be volatile and generally has a molecular weight of at least 150, preferably 200 or higher. The polymers being plasticized range from liquids having a molecular weight of about 2000 to high Mooney rubbers, for example, rubber with a Mooney value (ML–4 at 212° F.) of 120 or higher. Preferably our invention is used to plasticize normally solid polymers, particularly those with Mooney values greater than 50. If the molecular weight of the polymer or plasticizer is 20,000 or below the molecular weight can be determined by the boiling point elevation method and, if higher, by osmotic pressure measurement. The molecular weight for the polymers having the terminal epoxy and hydroxy groups is determined by calculation based upon the initiator charge. This method is quite accurate since the conversion is essentially quantitative. This is referred to as kinetic molecular weight.

The amount of plasticizer depends upon the polymer being plasticized and the type of plasticizer used as well as the results desired. Ordinarily from 1 to 50 parts by weight of plasticizer are used per 100 parts of rubber and more frequently the range of plasticizer is about 3 to 25 parts by weight per 100 parts of rubber.

The end products of this invention are useful as adhesives, potting compounds, tread stocks and also for manufacture of many types of molded objects. High molecular weight elastomers can be plasticized in accordance with the present process and vulcanized to give compositions that have higher tensile strength, modulus, and hardness than similar compositions in which a conventional non-functional plasticizer oil is employed. The advantages of our invention are further apparent from the following example. The conditions and proportions presented in this example are intended to be typical only and should not be construed to limit our invention unduly.

EXAMPLE

The following recipe was employed for the production of a butadiene/styrene rubbery copolymer:

| | |
|---|---|
| 1,3-butadiene, parts by weight | 70 |
| Styrene, parts by weight | 30 |
| Cyclohexane, parts by weight | 780 |
| 1,2-dilithio-1,2-diphenylethane, mmoles | 1.7 |
| Tetrahydrofuran, parts by weight | 1.5 |
| Temperature, ° F. | 122 |
| Time, hours | 2.5 |
| Conversion, percent | 100 |

The 1,2-dilithio-1,2-diphenylethane was prepared by the reaction of lithium with trans-stilbene (1,2-diphenylethylene). The recipe was as follows:

| | Parts by weight |
|---|---|
| Trans-stilbene (0.15 mole) | 27 |
| Lithium (0.50 mole) | 3.5 |
| Diethyl ether (450 ml.) | 321 |
| Tetrahydrofuran (50 ml.) | 44 |
| Temperature, ° F. | 122 |
| Time, hours | 2 |
| Total alkalinity, N | 0.6 |

When carrying out the polymerization, cyclohexane was charged first after which the reactor was purged with nitrogen. Butadiene was added and then the 1,2-dilithio-1,2-diphenylethane. The temperature was regulated at 122° F. and after two hours the conversion was quantitative.

At the end of the polymerization the lithium telechelic polymer was treated with an excess (5 times stoichiometric) of a dicyclo diepoxy carboxylate, more specifically (2 - methyl - 4,5 - epoxycyclohexyl)methyl 2 - methyl-4,5-epoxycyclohexyl carboxylate. This material is a Union Carbide product designated as EP–201 and having the formula

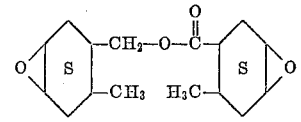

Treatment with the diepoxide converted the lithium terminal groups in the polymer to epoxy-hydroxy terminal groups. An instantaneous reaction occurred upon addition of the terminating agent. The polymer solution was washed with water, and the polymer was coagulated in isopropyl alcohol and dried in a vacuum oven after which 0.5 weight percent of 2,2'-methylene-bis(4-methyl-6-tert-butylphenol) was added as an antioxidant. The product had a Mooney value (ML–4 at 212° F.) of 107.5.

The rubbery telechelic polymer was compounded in a black-loaded recipe using a curing system comprising dicumyl peroxide and PAPI–1 (a polyaryl polyisocyanate). Four runs were made. In two of the runs Philrich 5 (a highly aromatic oil) was employed as a plasticizer while in the other runs a diepoxide designated as AG–13E (bis-epoxydicyclopentyl ether of ethylene glycol, Rohm and Haas) was used. This latter material has the formula

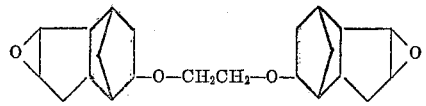

The stocks were cured 30 minutes at 307° F. and physical properties determined. Compounding recipes and results of physical tests are presented in the following table:

COMPOUNDING RECIPES (PARTS BY WEIGHT)

| Polymer | 100 | 100 | 100 | 100 |
|---|---|---|---|---|
| Philblack O [1] | 50 | 50 | 50 | 50 |
| Di-Cup 40C [2] | 1.5 | 1.5 | 1.5 | 1.5 |
| PAPI-1 | 1.0 | 2.0 | 1.0 | 2.0 |
| Diepoxide AG-13E | 10 | 10 | | |
| Philrich 5 | | | 10 | 10 |

PHYSICAL DATA (STOCKS CURED 30 MINUTES AT 307° F.)

| Compression set, percent | 2.4 | 3.5 | 5.2 | 5.2 |
|---|---|---|---|---|
| Modulus, 300 percent | 1,140 | 1,300 | 920 | 1,140 |
| Tensile, p.s.i. | 2,820 | 3,040 | 2,750 | 2,580 |
| Elongation, percent | 600 | 570 | 660 | 555 |
| Shore A hardness | 64 | 68 | 62 | 62.5 |
| Resilience, percent | 62.4 | 62.9 | 63.1 | 64.0 |

[1] High abrasion furnace black.
[2] A product containing 40 percent dicumyl peroxide and 60 percent precipitated $CaCO_3$.

These data show that vulcanizates with improved properties were obtained when a plasticizer with functional groups was employed. The compositions in the first two runs had higher modulus and tensile strength and were somewhat harder than those in the last two runs in which the conventional plasticizer oil was used.

As will be apparent to those skilled in the art various modifications can be made in our invention without departing from the spirit or scope thereof.

We claim:

1. A process for producing a polymeric product which comprises mixing a plasticizer containing at least 1 of the functional groups selected from the group consisting of hydroxy and epoxy groups with a polymer having substantially higher molecular weight and containing a hydroxy group and an epoxy group on at least 1 end of the polymer molecule, said polymer being a polymerizate of a vinylidene-containing monomer selected from the group consisting of conjugated dienes having 4 to 12 carbon atoms per molecule, vinyl-substituted aromatic compounds, vinyl-substituted pyridine and quinoline compounds, acrylic and alkacrylic acid esters, nitriles, N,N-disubstituted amides, vinylfuran and N-vinylcarbazole, and curing the resulting plasticized polymer by reaction with a polyfunctional coupling reagent reactive with the functional group of said plasticizer and selected from the group consisting of polyisocyanates having the formula $R(NCO)_m$ wherein $m$ is 2 to 4 and R is a polyvalent organic radical containing 2 to 30 carbon atoms, polybasic acids containing from 4 to 10 carbon atoms and having from 2 to 4 carboxy groups, anhydrides of said acids, acid chlorides of said acids, polyamines having 2 to 12 carbon atoms and 2 to 5 amino groups, and chloromethylphosphonic dichloride.

2. A process for producing a cured polymeric product which comprises mixing a polymer containing a hydroxy group and an epoxy group on at least 1 end of the polymer molecule, said polymer being a polymerizate of a vinylidene-containing monomer selected from the group consisting of conjugated dienes having 4 to 12 carbon atoms per molecule, vinyl-substituted aromatic compounds, vinyl-substituted pyridine and quinoline compounds, acrylic and alkacrylic acid esters, nitriles, N,N-disubstituted amides, vinylfuran and N-vinylcarbazole, with a plasticizing amount of an organic compound having a molecular weight of at least 150 and not greater than 10 percent of the molecular weight of said polymer and containing at least 1 functional group selected from the group consisting of hydroxy and epoxy groups, and curing the plasticized polymer by reaction with a polyfunctional coupling agent reactive with said functional group of said organic compound and selected from the group consisting of polyisocyanates having the formula $R(NCO)_m$ wherein $m$ is 2 to 4 and R is a polyvalent organic radical containing 2 to 30 carbon atoms, polybasic acids containing from 4 to 10 carbon atoms and having from 2 to 4 carboxy groups, anhydrides of said acids, acid chlorides of said acids, polyamines having 2 to 12 carbon atoms and 2 to 5 amino groups, and chloromethylphosphonic dichloride.

3. A process for producing a cured polymer product which comprises mixing 100 parts by weight of a polymer of a conjugated diene having from 4 to 12 carbon atoms per molecule, said polymer containing a hydroxy group and an epoxy group on each end of the polymer molecule, with from 1 to 50 parts by weight of an organic compound having a molecular weight of at least 150 and not greater than 10 percent of the molecular weight of said conjugated diene polymer and containing at least 2 functional groups selected from the group consisting of hydroxy and epoxy groups, and curing the resulting plasticized polymer by reaction at a temperature in the range of −100 to 500° F. with a polyfunctional organic coupling agent reactive with said functional groups of said organic compound and selected from the group consisting of polyisocyanates having the formula $R(NCO)_m$ wherein $m$ is 2 to 4 and R is a polyvalent organic radical containing 2 to 30 carbon atoms, polybasic acids containing from 4 to 10 carbon atoms and having from 2 to 4 carboxy groups, anhydrides of said acids, acid chlorides of said acids, polyamines having 2 to 12 carbon atoms and 2 to 5 amino groups, and chloromethylphosphonic dichloride.

4. A process for producing a cured polymeric product which comprises mixing with 100 parts by weight of a polymer of conjugated diene having from 4 to 12 carbon atoms per molecule, said polymer containing a hydroxy group and an epoxy group on each end of the polymer molecule, with from 3 to 25 parts by weight of a plasticizer which is an organic compound having a molecular weight of at least 150 and not greater than 10 percent of the molecular weight of said conjugated diene polymer and containing at least 2 functional groups selected from the group consisting of hydroxy and epoxy groups, and curing the resulting plasticized polymer by reaction at a temperature in the range of 50 to 350° F. with a polyfunctional curative which is an organic compound selected from the group consisting of polyisocyanates having the formula $R(NCO)_m$ wherein $m$ is 2 to 4 and R is a polyvalent organic radical containing 2 to 30 carbon atoms, polybasic acids having 4 to 10 carbon atoms and containing 2 to 4 carboxy groups, polybasic acid chlorides of said acids, acid anhydrides of said acids, polyamines having 2 to 12 carbon atoms and 2 to 5 amino groups, and chloromethylphosphonic dichloride, said polyfunctional coupling agent being reactive with said functional groups of said plasticizer.

5. A process for producing a cured polymer product which comprises mixing 100 parts by weight of a polymer of a conjugated diene having from 4 to 12 carbon atoms per molecule, said polymer containing a hydroxy group and an epoxy group on each end of the polymer molecule, with from 1 to 50 parts by weight of an organic compound having a molecular weight of at least 150 but not greater than 10 percent of the molecular weight of said conjugated diene polymer and containing at least 2 functional groups selected from the group consisting of hydroxy and epoxy groups, compounding plasticized polymer with a material selected from the group consisting of carbon black and mineral filler, and curing the resulting composition in the presence of an organic peroxide by reaction of said polymer and said organic compound at a temperature in the range of −100 to 500° F. with a polyfunctional organic coupling agent reactive with said functional groups of said organic compound and selected from the group consisting of polyisocyanates having the formula $R(NCO)_m$ wherein $m$ is 2 to 4 and R is a polyvalent organic radical containing 2 to 30 carbon atoms, polybasic acids containing from 4 to 10 carbon atoms and having from 2 to 4 carboxy groups, anhydrides of said acids, acid chlorides of said acids, polyamines having 2 to 12 carbon atoms and 2 to 5 amino groups, and chloromethylphosphonic dichloride.

6. A process for producing a cured polymeric product which comprises mixing 100 parts by weight of a polymer of 1,3-butadiene, said polymer containing both a hydroxy group and an epoxy group on each end of the polymer molecule, with from 3 to 25 parts by weight of bis-epoxydicyclopentyl ether of ethylene glycol, and curing the resulting plasticized polymer by reaction at 50 to 350° F. with a polyaryl polyisocyanate having an average of 3 isocyanate groups per molecule and an average molecular weight of about 380.

7. The polymeric product prepared by the process of claim 1.

8. The polymeric product prepared by the process of claim 4.

9. The polymeric product prepared by the process of claim 2.

References Cited by the Examiner
UNITED STATES PATENTS

| | | | |
|---|---|---|---|
| 2,842,513 | 7/58 | Fitz Gerald | 260—94.7 |
| 2,877,212 | 3/59 | Seligman | 260—94.7 |
| 3,043,852 | 7/62 | Mills | 260—30.4 |

LEON J. BERCOVITZ, *Primary Examiner.*

H. N. BURSTEIN, *Examiner.*